(12) United States Patent
Lin (10) Patent No.: US 10,806,249 B2
(45) Date of Patent: Oct. 20, 2020

(54) DUAL-COLUMN OFFICE TABLE

(71) Applicant: JIANGYIN KAO YI MECHANIZATION INDUSTRY CO., LTD., Jiangsu (CN)

(72) Inventor: Yen-Chun Lin, Tainan (TW)

(73) Assignee: Jiangyin Kao Yi Mechanization Industry Co., Ltd., Jiangyin, Jiangsu (CN)

( * ) Notice: Subject to any disclaimer, the term of this patent is extended or adjusted under 35 U.S.C. 154(b) by 107 days.

(21) Appl. No.: 16/210,336

(22) Filed: Dec. 5, 2018

(65) Prior Publication Data

US 2019/0191867 A1    Jun. 27, 2019

(30) Foreign Application Priority Data

Dec. 25, 2017    (CN) .......................... 2017 1 1419166

(51) Int. Cl.
*A47B 9/20*    (2006.01)
*A47B 9/10*    (2006.01)
(Continued)

(52) U.S. Cl.
CPC .................. *A47B 9/20* (2013.01); *A47B 9/04* (2013.01); *A47B 9/10* (2013.01); *A47B 21/02* (2013.01);
(Continued)

(58) Field of Classification Search
CPC .... A47B 9/10; A47B 9/04; A47B 9/00; A47B 21/02; A47B 2200/0051; A47B 19/06;
(Continued)

(56) References Cited

U.S. PATENT DOCUMENTS 1,359,790 A * 11/1920 Campbell ............... B66C 23/20
248/285.1
3,285,207 A * 11/1966 Vom Hagen ........... A47B 9/083
108/146

(Continued)

FOREIGN PATENT DOCUMENTS

DE        10053987    *  5/2002
DE     102011012889    *  9/2012
(Continued)

*Primary Examiner* — Janet M Wilkens
(74) *Attorney, Agent, or Firm* — Rosenberg, Klein & Lee (57) ABSTRACT

A dual-column office table includes two oppositely disposed stationary upright columns with a connecting rod transversely connected therebetween, two guiding columns separately disposed in the two stationary upright columns, at least one steel ball sleeve fitted on either guiding column, two driving units separately disposed in the two guiding columns, and a table top to which a top portion of each guiding column is fixedly connected. A bottom end of each guiding column is provided with a limiting structure protruding outward. A bottom end of the each driving unit is fixed to a respective table base provided at bottom portion of each stationary upright column. The table top has a bottom surface fixedly connected with a fixing seat and is provided with a lifting control switch, the lifting control switch being connected with the driving units and having an end disposed in the fixing seat.

5 Claims, 6 Drawing Sheets (51) Int. Cl.
*A47B 21/02* (2006.01)
*F16C 3/035* (2006.01)
*A47B 9/04* (2006.01)
*F16C 29/06* (2006.01)
*F16C 29/04* (2006.01)

(52) U.S. Cl.
CPC ............ *F16C 3/035* (2013.01); *F16C 29/069* (2013.01); *A47B 2200/0051* (2013.01); *F16C 29/046* (2013.01); *F16C 2314/70* (2013.01)

(58) Field of Classification Search
CPC ......... A47B 39/02; A47B 41/02; F16C 3/035; F16C 29/069; F16C 29/046; F16C 2314/70
USPC ......... 108/147.19, 147; 248/161, 157, 125.1, 248/188.5, 188.2, 295.11, 298.1
See application file for complete search history.

(56) References Cited

U.S. PATENT DOCUMENTS

| | | | | |
|---|---|---|---|---|
| 3,311,337 A * | 3/1967 | Vom Hagen | ............ | A47B 9/00 248/188.5 |
| 4,183,689 A * | 1/1980 | Wirges | ..................... | A47C 3/30 108/147 |
| 4,526,334 A * | 7/1985 | Rantakari | ............... | A47B 9/083 248/157 |
| 5,552,550 A * | 9/1996 | Bringmann | .......... | C07D 217/02 546/141 |
| 6,189,843 B1 * | 2/2001 | Pfister | .................... | A47B 9/083 248/157 |
| 6,378,816 B1 * | 4/2002 | Pfister | .................... | A47B 9/083 248/157 |
| 7,270,062 B1 * | 9/2007 | Larson | ..................... | A47B 9/10 108/147 |
| 7,914,238 B2 * | 3/2011 | Spearing | ................. | E21D 15/43 405/288 |
| 9,743,755 B2 | 8/2017 | Lin | | |
| 10,537,172 B2 * | 1/2020 | Lin | .......... | A47B 9/10 |
| 2020/0037753 A1 * | 2/2020 | Ko | ........ | F16C 29/048 |

FOREIGN PATENT DOCUMENTS

| | | | |
|---|---|---|---|
| DE | 102017110017 | * | 11/2018 |
| FR | 2166425 | * | 8/1973 |
| JP | 2009233079 A | | 10/2009 |
| TW | M461623 U1 | | 9/2013 |

* cited by examiner

DUAL-COLUMN OFFICE TABLE

FIELD OF THE INVENTION

The present invention relates to office supplies, and more particularly to a dual-column office table that can be vertically lifted or lowered stably, and does not tilt inadvertently, and can conform to the principle of ergonomics.

BACKGROUND OF THE INVENTION

In general, a table has a certain height and cannot be adjusted in height. Due to the limited height of use, its practicality is reduced greatly, and it is not ergonomic. For this reason, a table with a lifting device that can be adjusted in height at will is developed, for example, Taiwanese Utility Model Patent No. M461623 titled "LIFTING DEVICE" published on Sep. 11, 2013. The lifting device comprises an upper seat, a gas pressure rod installed under the upper seat, two support rods extending downward from the upper seat, and a lower seat for receiving the gas pressure rod and the two support rods. Each of the support rods has an outer peripheral surface, at least one collar connected to the outer peripheral surface, and a plurality of balls movably mounted on the collar and abutting against the outer peripheral surface. The lower seat has a standing stand, a through hole passing through the standing stand for insertion of the gas pressure rod, and two sleeves disposed in the standing stand for insertion of the two support rods. The sleeve has an inner peripheral surface abutting against the plurality of balls. The two support rods are used to assist the gas pressure rod in supporting an object, so that the object is displaced in a stable manner during the lifting operation; meanwhile, the plurality of balls facilitate upward and downward movement of the two support rods within the two sleeves, thus improving stability of the lifting device.

However, in the lifting device of the above patent, the outer peripheral surface of each support rod is sleeved with the plurality of collars, and the plurality of balls are movably mounted on the collars, therefore, the assembly work is complicated and time consuming. Besides, the balls contact the outer peripheral surface of the support rod and the inner peripheral surface of the sleeve in a point contact manner. Not only the point contact pressure is large, but also the volume is large. Especially, an elliptical table top is to cooperate with a cylindrical movable tube, which is not only mismatched but also unattractive.

U.S. Pat. No. 9,743,755, published on Aug. 29, 2017, discloses a lifting device, comprising a driving unit, a movable tube, and a rolling unit. The driving unit includes an actuating rod having one end connected to the bottom surface of an object, a sleeve fixed on the outer circumference of the actuating rod and having at least two flat surfaces extending in the axial direction, and an actuating cylinder disposed at the other end of the actuating rod and capable of driving the actuating rod to extend and retract relative to the sleeve, and a control member connected to the actuating cylinder and capable of controlling the opening and closing of the actuating cylinder. The movable tube is fitted outside the sleeve and has one end connected to the bottom surface of the object. When the actuating rod is telescopically movable relative to the sleeve, the movable tube can be moved up and down synchronously. The rolling unit includes a plurality of rotors that are rotatably disposed on the movable tube and that constantly contact the flat surfaces of the sleeve. In this way, the object can be moved up and down stably.

Figure 6:
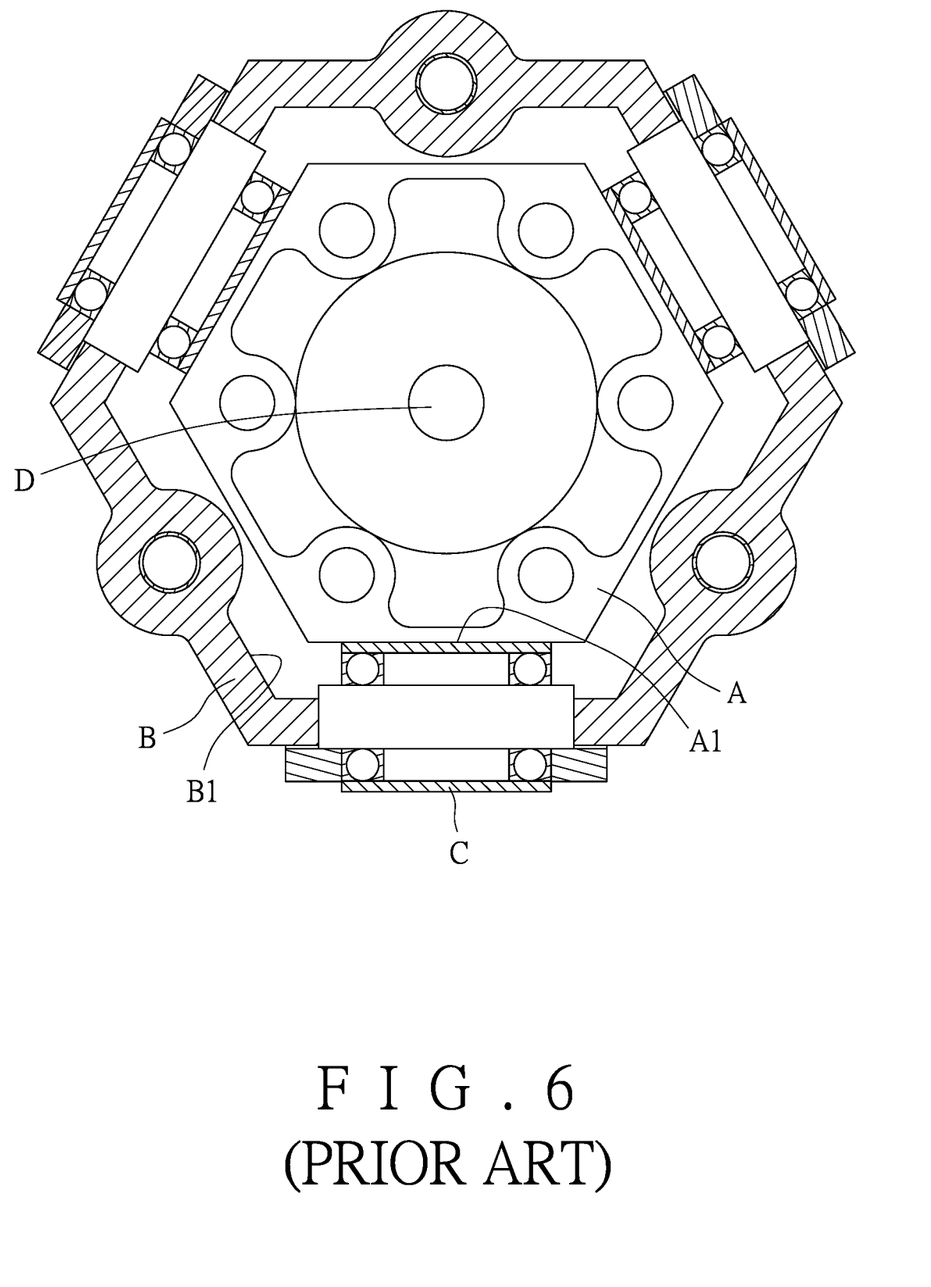
FIG. 6 is a cross-sectional view of a lifting device of a conventional table.

As shown in FIG. 6, since the sleeve (A) of the above patent is a regular hexagonal structure, it has six flat surfaces (A1) extending in the axial direction. The movable tube (B) is also a regular hexagonal structure. The movable tube (B) has six inner wall surfaces (B1) corresponding to the six flat surfaces (A1). The six inner wall surfaces (B1) of the movable tube (B) are respectively provided with three rolling units (C) that are spaced apart from each other. The sleeve (A) and the movable tube (B) can be relatively moved through the three rolling units (C). When the table top is required to be lifted, the actuating rod (D) of the driving unit and the top end of the movable tube (B) are connected to the table top (not shown), so that the movable tube (B) can be lifted and displaced by the extension of the actuating rod (D), and the table top is driven to lift simultaneously so as to adjust the height of the table top. However, after the table is used for a period of time, because only three rolling units (C) are provided on the regular hexagon movable tube (B), there is a gap between the other flat surfaces (A1) not having the rolling units (C) and the inner wall surface (B1), which may lead to the looseness of the table. Therefore, when the load on the table top is not uniform or the table top is lifted too high, the movable tube (B) is likely to be inclined toward the gap. The table has some disadvantages, bulky, unmatched, and unattractive.

SUMMARY OF THE INVENTION

In view of the technical problem of the prior art, the primary object of the present invention is to provide a dual-column office table that can be kept vertical and stable without any tilt and is artistic.

The technical solution adopted by the present invention is described below. A dual-column office table includes two stationary upright columns, two guiding columns, at least one steel ball sleeve, two driving units, and a table top. The two stationary upright columns are disposed oppositely. A bottoms portion of each stationary upright column is provided with a respective table base. A connecting rod is transversely connected between the two stationary upright columns. The two guiding columns are disposed in the two stationary upright columns, separately. Top portions of the two guiding columns are fixed to the table top. A bottom end of each guiding column is provided with a respective limiting structure protruding outward. The at least one steel ball sleeve is fitted on either guiding column and is located between an inner wall surface of the corresponding stationary upright column and an outer wall surface of the corresponding guiding column. The two driving units are disposed in the two guiding columns, separately. A bottom end of each driving unit is fixed to a respective one of the table bases. A top portion of the table top is provided with a lifting control switch connected with the two driving units. A bottom surface of the table top is fixedly connected with a fixing seat. Top ends of the two guiding columns and the two driving units are fixedly connected with the fixing seat. An end of the lifting control switch is disposed in the fixing seat.

Preferably, the limiting structures are C-shaped buckles protruding outward at the bottom ends of the guiding columns.

Preferably, the steel ball sleeve includes a sleeve body made of a plastic material and a steel ball embedded on a surface of the sleeve body. The steel ball is configured to be in contact with the stationary upright columns and the guiding columns, so that a rolling friction is generated when the guiding columns are lifted or lowered relative to the stationary upright columns.

Preferably, a plurality of steel ball sleeves are provided on either guiding column and located between the corresponding stationary upright column and the corresponding guiding column. A spacing column is provided between every adjacent two of the steel ball sleeves. The steel ball sleeves which are located at the bottom ends of the guiding columns are limited in position by the limiting structures.

Preferably, each of the two driving units is a gas spring and is provided with a gas pressure rod. Top ends of the gas pressure rods are connected to the fixing seat.

Preferably, the two stationary upright columns and the two guiding columns each are clad with a respective decorative cover. Each decorative cover has an octagonal cross-section and is formed with a respective slot for cooperating with the connecting rod, wherein two of the slots which are formed on the decorative covers of the stationary upright columns correspond in position to top portions of the stationary upright columns and are opposite to each other, and the other two of the slots which are formed on the decorative covers of the guiding columns are opposite to each other.

Compared with the prior art, the present invention preferably has the following advantages:

1. The connecting rod is transversely connected between the two stationary upright columns, so that the two guiding columns can be kept vertical and stable without causing any tilt.

2. Each guiding column is provided with a respective gas pressure rod. The two gas pressure rods are simultaneously controlled by the lifting control switch to ensure the stability of the table top to be lifted or lowered, without any tilt. In any position, the table top is not easily shaken when it is applied with a force.

3. The sliding friction between the two stationary upright columns and the two guiding columns is changed to a rolling friction through the steel ball sleeves, so that the contact can be muted while sliding, and the lifting operation is smoother.

DETAILED DESCRIPTION OF THE PREFERRED EMBODIMENTS

Figure 1:
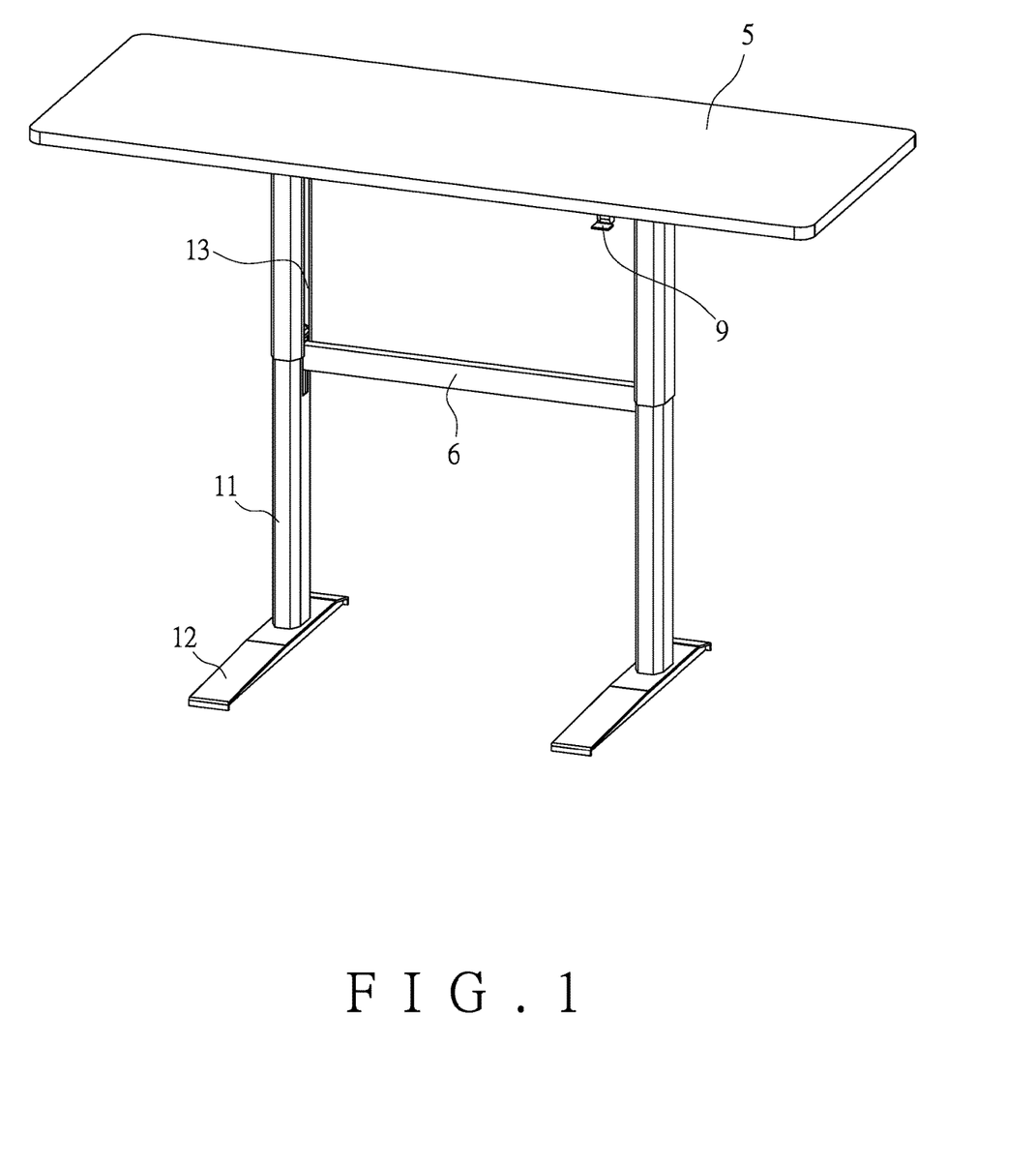
FIG. 1 is a perspective view in accordance with an embodiment of the present invention.
Figure 5:
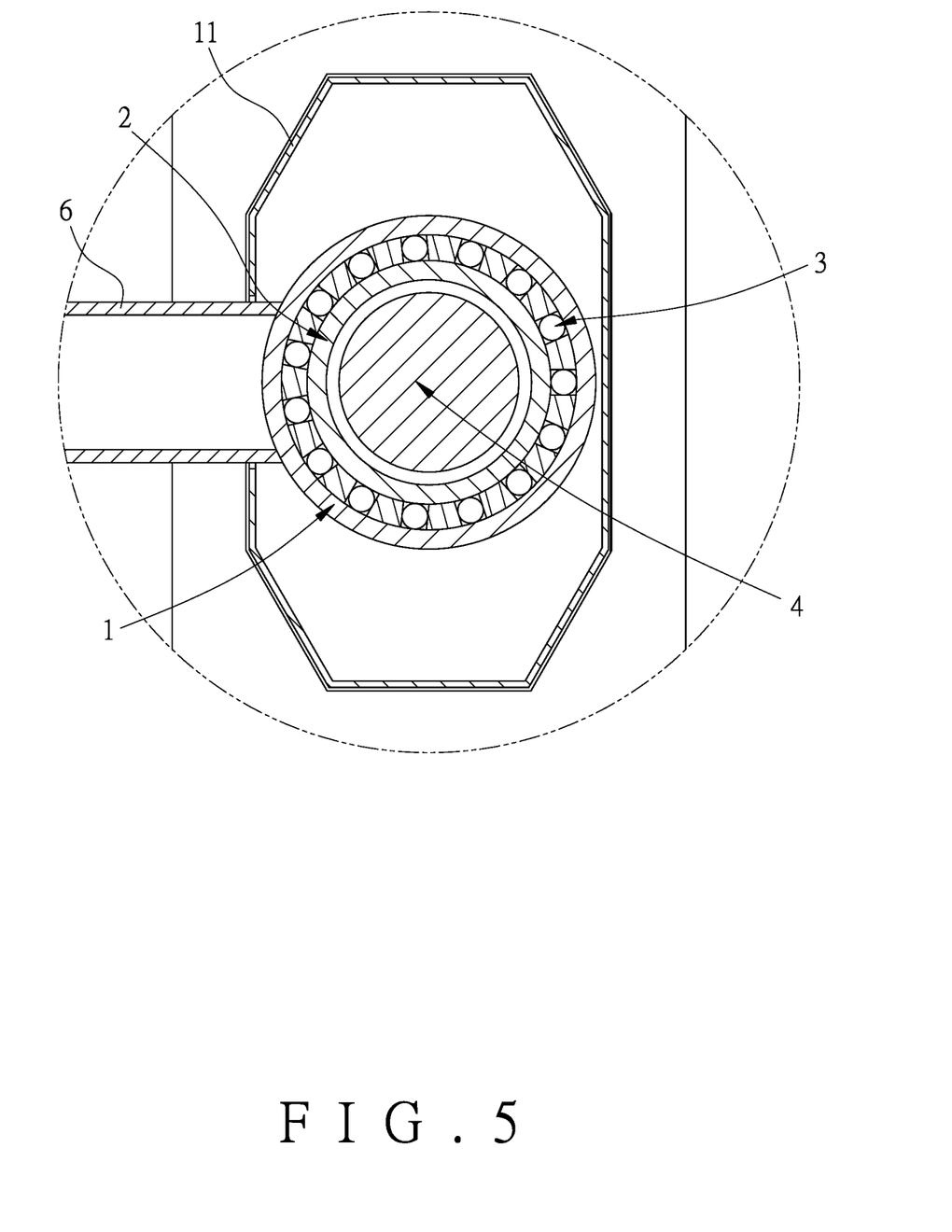
FIG. 5 is a cross-sectional view taken along line V-V of FIG. 4.

As shown in FIG. 1 and FIG. 5, a dual-column office table according to an embodiment of the present invention includes two stationary upright columns (1), two guiding columns (2), at least one steel ball sleeve (3), two driving units (4), and a table top (5).

The two stationary upright columns (1) are disposed oppositely. Each of the two stationary upright columns (1) is tubular. A bottom portion of each stationary upright column (1) is provided with a respective table base (12). A connecting rod (6) is transversely connected between the two stationary upright columns (1), so that the table can be kept vertical and stable during the lifting operation without causing any tilt.

Figure 4:
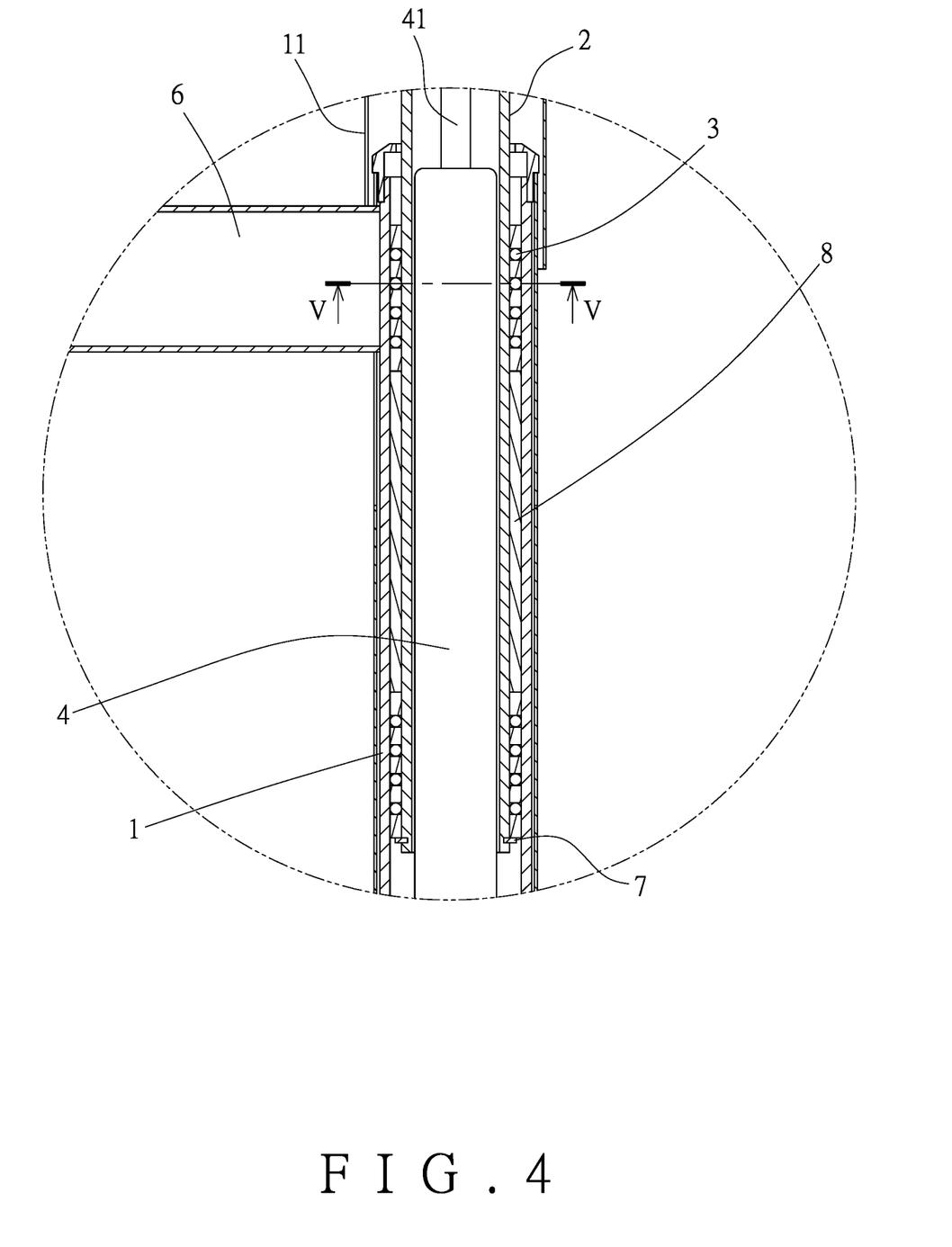
FIG. 4 is an enlarged view of the circle IV of FIG. 3.

The two guiding columns (2) are disposed in the two stationary upright columns (1), separately. Top portions of the two guiding columns (2) are fixed to the table top (5). Each guiding column (2) has a circular tubular cross-section. Bottom ends of the two guiding columns (2) are free ends and can be freely lifted or lowered along the surfaces of the stationary upright columns (1). Preferably, the bottom end of each guiding column (2) is provided with a C-shaped buckle (7) protruding outward (as shown in FIG. 4).

The at least one steel ball sleeve (3) is fitted on either of the two guiding columns (2) and located between an inner wall surface of the corresponding stationary upright column (1) and an outer wall surface of the corresponding guiding column (2). Each steel ball sleeve (3) includes a sleeve body made of a plastic material and steel balls embedded on a surface of the sleeve body. The steel balls are configured to be in contact with the stationary upright columns (1) and the guiding columns (2), so that a rolling friction is generated when the guiding columns (2) are lifted or lowered relative to the stationary upright columns (1), making the lifting operation smoother. In order to improve the smoothness of the lifting operation, a plurality of steel ball sleeves (3) may be provided on either of the two guiding columns (2), and a spacing column (8) is provided between every adjacent two of the steel ball sleeves (3). While saving the number of the steel ball sleeves, the area of the rolling friction is increased. In addition, due to the action of the C-shaped buckle (7) at the bottom end of the guiding column (2), the steel ball sleeves (3) and the spacing column (8) can be prevented from falling off.

The two driving units (4) are disposed in the two guiding columns (2), separately. A bottom end of each driving unit (4) is fixed to a respective one of the table bases (12). Each of the two driving unit (4) is a gas spring and is provided with a respective gas pressure rod (41), as shown in FIG. 4.

Figure 2:
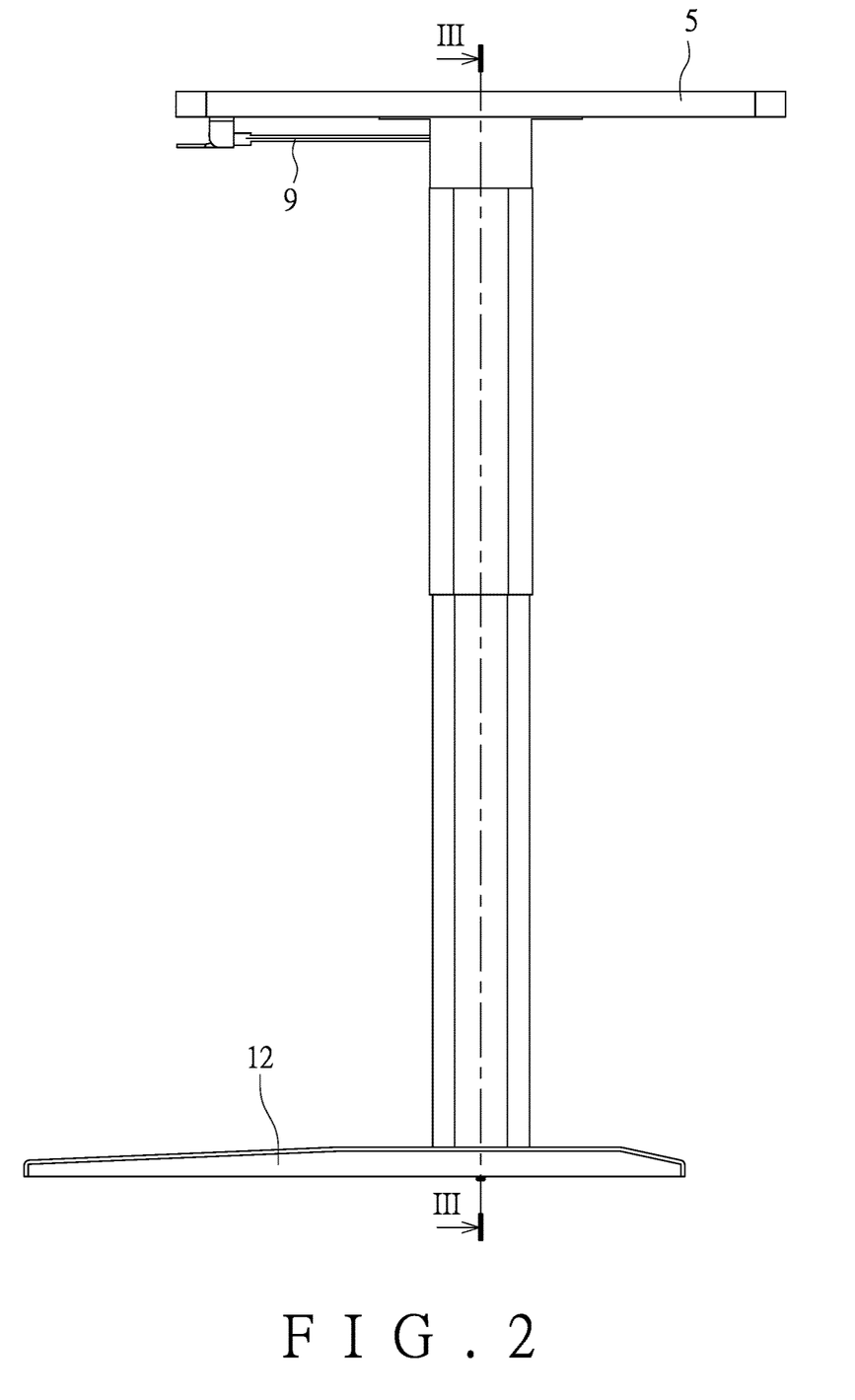
FIG. 2 is a side view of FIG. 1.
Figure 3:
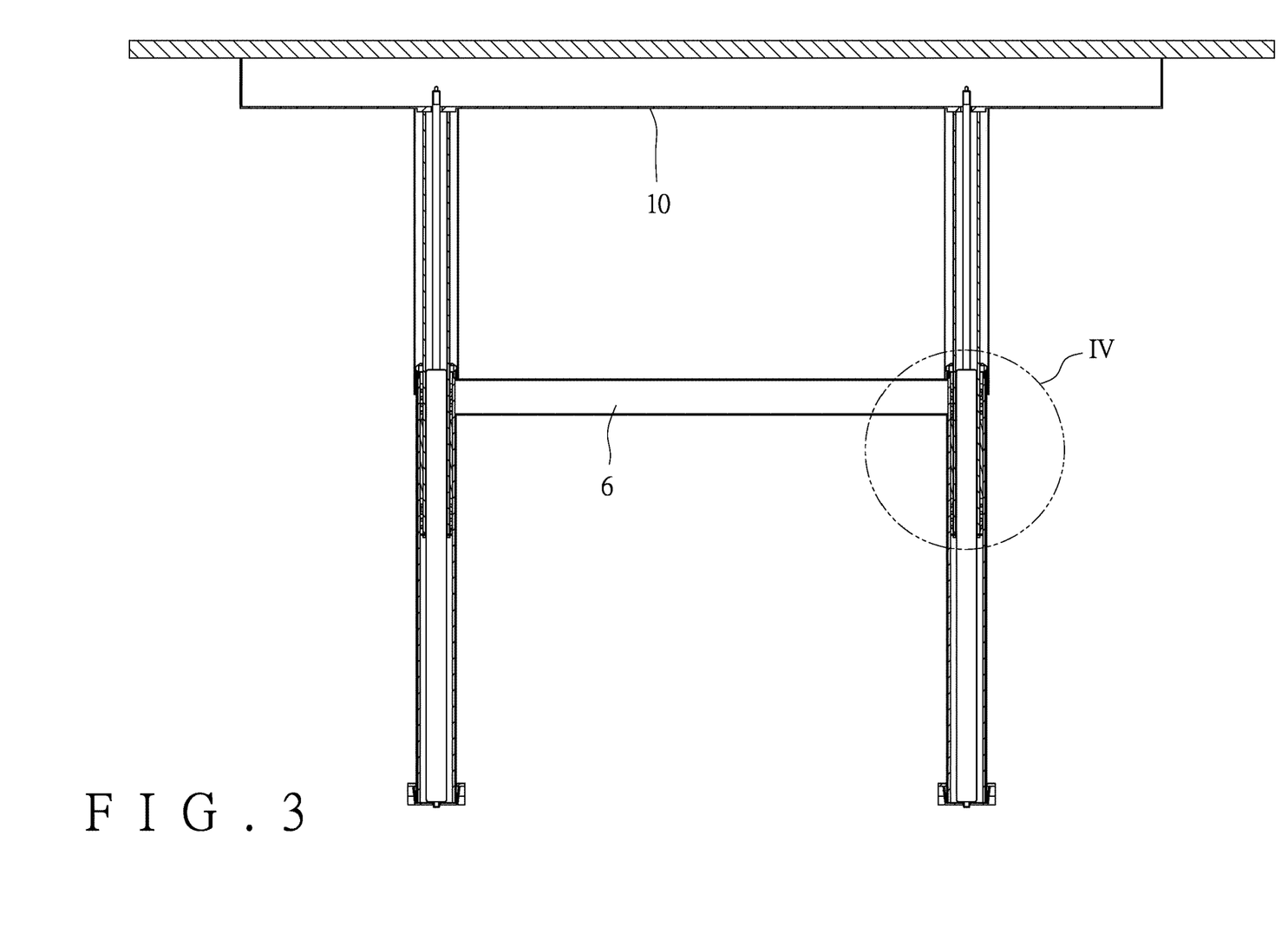
FIG. 3 is a cross-sectional view taken along line of FIG. 2.

The table top (5) can be synchronously lifted or lowered along with the two driving units (4) and the two guiding columns (2). Further, the table top (5) is provided with a lifting control switch (9) (as shown in FIG. 2), by which the gas pressure rods (41) of the two driving units (4) can be controlled to lift or lower. A bottom surface of the table top (5) is fixedly connected with a fixing seat (10) (as shown in FIG. 3). The fixing seat (10) is fixedly connected with top ends of the two guiding columns (2) and top ends of the gas pressure rods (41) of the two driving units (4). The lifting control switch (9) has an end disposed in the fixing seat (10) for actuating the two driving units (4).

Referring to FIG. 2 and FIG. 4, when the height of the table top (5) is to be lowered, a user can pull the lifting control switch (9) and apply a force to retract the gas pressure rods (41) of the two driving units (4) downward. Consequently, the two guiding columns (2) and the table top (5) are simultaneously moved downward since the top ends of the two gas pressure rods (41) and the two guiding columns (2) are all fixed to the fixing seat (10) at the bottom surface of the table top (5). During the downward movement of the two guiding columns (2), the outer wall surfaces of the two guiding columns (2) are in sliding contact with the steel ball sleeves (3) (as shown in FIG. 5), so that the lifting operation is smoother and not laborious.

When the table top (5) needs to be lifted, only the lifting control switch (9) needs to be pulled. That is to say, upon the lifting control switch (9) is pulled, the table top (5) can lift automatically. The two guiding columns (2) and the steel ball sleeves (3) are slid upwardly in the same manner as the above-mentioned downward movement, and will not be described again. It can be ensured that the two guiding columns (2) are kept vertical and stable without any tilt.

In order to ensure the aesthetic effect of the office tables, each of the two stationary upright columns (1) and the two guiding columns (2) is clad with a respective decorative cover (11) (as shown in FIG. 1). Each of the decorative covers (11) has an octagonal cross-section and is formed with a respective slot for cooperating with the connecting rod (6); to be more specific, the two slots which are formed on the decorative covers (11) of the stationary upright columns (1) correspond in position to top portions of the two stationary upright columns (1) and are opposite to each other, and the other two slots which are formed on the decorative covers (11) of the two guiding columns (2) are opposite to each other, so that the two guiding columns (2) can be moved up and down smoothly Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A dual-column office table, comprising:
a table top;
two stationary upright columns disposed oppositely, wherein a bottom portion of each stationary upright column is provided with a respective table base, and a connecting rod is transversely connected between the two stationary upright columns;
two guiding columns disposed in the two stationary upright columns, separately, wherein a top portion of each guiding column is fixed to the table top, and a bottom end of each guiding column is provided with a respective limiting structure, the limiting structures are formed by C-shaped buckles protruding outward at the bottom end of each of the two guiding columns;
at least one steel ball sleeve fitted on either of the two guiding columns and located between an inner wall surface of the corresponding stationary upright column and an outer wall surface of the corresponding guiding column; and
two driving units disposed in the two guiding columns, separately, wherein a bottom end of each driving unit is fixed to a respective one of the table bases;
wherein the table top is provided with a lifting control switch connected with the two driving units; a bottom surface of the table top is fixedly connected with a fixing seat; the fixing seat is fixedly connected with top ends of the two guiding columns and top ends of the two driving units; the lifting control switch having an end disposed in the fixing seat.

2. The dual-column office table as claimed in claim 1, wherein each of the steel ball sleeves includes a sleeve body made of a plastic material and a steel ball embedded on a surface of the sleeve body; the steel balls of the steel ball sleeves are configured to be in contact with the stationary upright columns and the guiding columns, so that a rolling friction is generated when the guiding columns are lifted or lowered relative to the stationary upright columns.

3. The dual-column office table as claimed in claim 1, wherein each of the two driving units is a gas spring, and is provided with a respective gas pressure rod having a top end connected to the fixing seat.

4. A dual-column office table, comprising:
a table top;
two stationary upright columns disposed oppositely, wherein a bottom portion of each stationary upright column is provided with a respective table base, and a connecting rod is transversely connected between the two stationary upright columns;
two guiding columns disposed in the two stationary upright columns, separately, wherein a top portion of each guiding column is fixed to the table top, and a bottom end of each guiding column is provided with a respective limiting structure which protrudes outward;
a plurality of steel ball sleeves provided on either of the two guiding columns and being located between the corresponding stationary upright column and the corresponding guiding column, a spacing column is provided between every adjacent two of the steel ball sleeves, the steel ball sleeves which are located at the bottom ends of the guiding columns are limited in position by the limiting structures; and
two driving units disposed in the two guiding columns, separately, wherein a bottom end of each driving unit is fixed to a respective one of the table bases;
wherein the table top is provided with a lifting control switch connected with the two driving units; a bottom surface of the table top is fixedly connected with a fixing seat; the fixing seat is fixedly connected with top ends of the two guiding columns and top ends of the two driving units; the lifting control switch having an end disposed in the fixing seat.

5. A dual-column office table as claimed, comprising:
a table top;
two stationary upright columns disposed oppositely, wherein a bottom portion of each stationary upright column is provided with a respective table base, and a connecting rod is transversely connected between the two stationary upright columns;
two guiding columns disposed in the two stationary upright columns, separately, wherein a top portion of each guiding column is fixed to the table top, and a bottom end of each guiding column is provided with a respective limiting structure which protrudes outward;
a plurality of decorative covers, each of the plurality of decorative covers being clad on a respective one of the two stationary upright columns and the two guiding columns; each of the plurality of decorative covers has an octagonal cross-section and is formed with a respective slot for cooperating with the connecting rod, and wherein two of the slots which are formed on the decorative covers of the two stationary upright columns correspond in position to top portions of the two stationary upright columns and are opposite to each other, and the other two of the slots which are formed on the decorative covers of the two guiding columns are opposite to each other;
at least one steel ball sleeve fitted on either of the two guiding columns and located between an inner wall surface of the corresponding stationary upright column and an outer wall surface of the corresponding guiding column; and
two driving units disposed in the two guiding columns, separately, wherein a bottom end of each driving unit is fixed to a respective one of the table bases;
wherein the table top is provided with a lifting control switch connected with the two driving units; a bottom surface of the table top is fixedly connected with a fixing seat; the fixing seat is fixedly connected with top ends of the two guiding columns and top ends of the two driving units; the lifting control switch having an end disposed in the fixing seat.

* * * * *